United States Patent [19]

Miller et al.

[11] Patent Number: 5,339,372
[45] Date of Patent: Aug. 16, 1994

[54] LOW LOSS COUPLER

[75] Inventors: William J. Miller; Daniel A. Nolan; David L. Weidman, all of Corning, N.Y.

[73] Assignee: Corning Incorporated, Corning, N.Y.

[21] Appl. No.: 75,129

[22] Filed: Jun. 9, 1993

[51] Int. Cl.$^5$ .................... G02B 6/28; C03C 25/02
[52] U.S. Cl. .......................... 385/29; 65/411; 65/412
[58] Field of Search ............... 385/27, 29, 31, 39, 385/43, 46; 65/3.11, 3.12, 4.21, 3.115, 4.2

[56] References Cited

U.S. PATENT DOCUMENTS

| | | | |
|---|---|---|---|
| 4,799,949 | 1/1989 | Keck et al. | 65/3.12 |
| 4,842,359 | 6/1989 | Imoto et al. | 385/43 |
| 5,017,206 | 5/1991 | Miller et al. | 65/3.11 |

*Primary Examiner*—Akm E. Ullah
*Attorney, Agent, or Firm*—W. J. Simmons, Jr.

[57] ABSTRACT

A low loss fiber optic coupler of the type wherein a plurality of single-mode optical fibers are fused together along a portion of the lengths thereof to form a coupling region. Each fiber includes a core and a cladding, the lowest refractive index of the fiber claddings being $n_2$. Each of the output fibers of the coupler further includes a surface region of refractive index $n_4$ that inhibits the coupling of light to lossy composite modes, $n_4$ being lower than $n_2$.

12 Claims, 3 Drawing Sheets

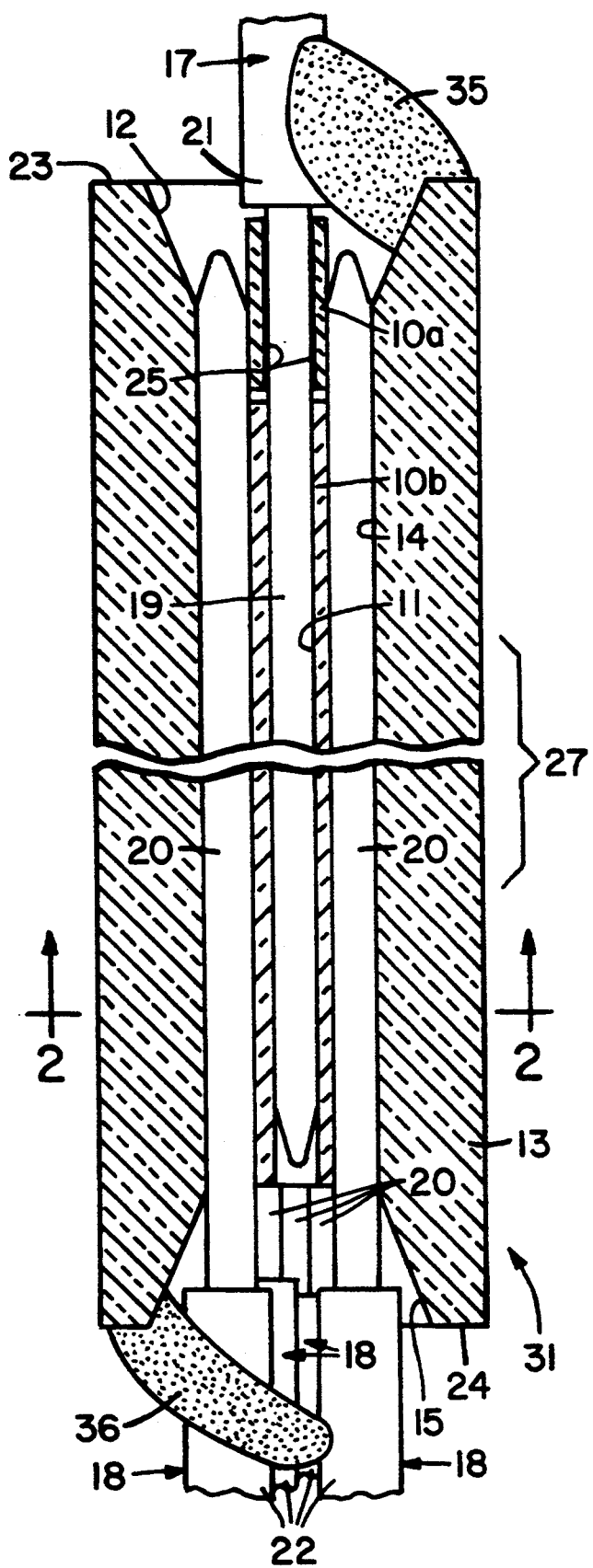
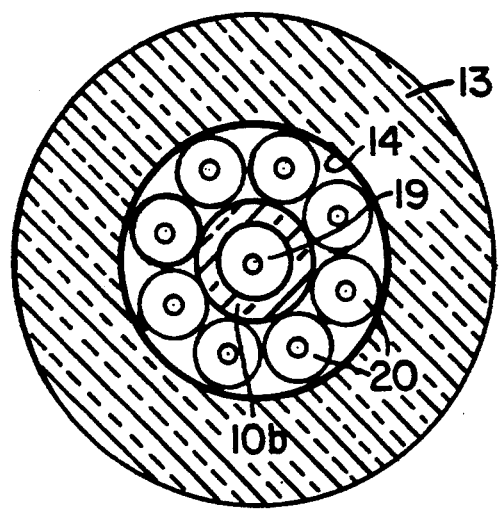
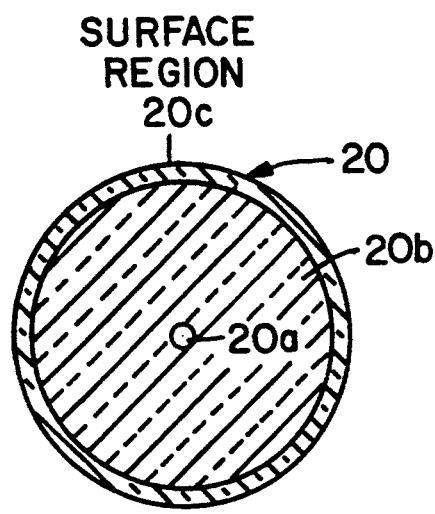
Fig. 1
Fig. 2
Fig. 3

LOW LOSS COUPLER

BACKGROUND OF THE INVENTION

This invention relates to single-mode fiber optic couplers that are capable of coupling light between fibers with low excess loss.

Fused fiber couplers have been formed by positioning a plurality of fibers in a side-by-side relationship along a suitable length thereof and fusing and tapering the claddings together to secure the fibers and reduce the spacings between the cores. Various coupler properties can be improved by forming an "overclad coupler" in which the fibers are embedded in a glass matrix. An overclad coupler is formed by inserting a plurality of optical fibers into a glass tube and collapsing the tube midregion onto the fibers. The central portion of the midregion is thereafter drawn down to that diameter and coupling length which is necessary to obtain the desired coupling. The refractive index $n_3$ of the inner region of the tube adjacent the fibers must be lower than the refractive index $n_2$ of the fiber cladding. Commercially available single-mode optical fibers usually have a value of $n_2$ that is equal to or near that of silica. If silica is employed as the base glass for the tube, a dopant such as $B_2O_3$, and optionally fluorine, is added thereto for the purpose of decreasing the tube refractive index $n_3$ to a value lower than $n_2$.

When the tube collapses onto the fibers, the fibers are distorted so that their cross-sectional shape is no longer round. Although some amount of distortion always occurs, the degree to which the fibers are distorted depends upon the relative viscosities of the fibers and the tube at the temperature of the tube collapse step as well as upon the temperature profile of the preform, the vacuum level during the collapse step and the glass geometry. The coupler function may dictate the refractive index and thus the hardness of the tube glass. For example, U.S. patent application Ser. No. 07/913,390 now U.S. Pat. No. 5,268,979 (D. L. Weidman-6) filed Jul. 15, 1992, now U.S. Pat. No. 5,268,979 teaches an overclad achromatic fiber optic coupler of the type wherein a plurality of single-mode optical fibers are fused together along a portion of their lengths to form a coupling region that is surrounded by a matrix glass body of refractive index $n_3$. The coupler taper and $n_3$ are such that the coupling constants of the coupler at two widely separated wavelengths are identical, thus giving achromatic performance. The value of $\Delta_{2-3}$ is preferably chosen so that nonadiabatic taper excess loss is kept below 0.5 dB. A discussion of nonadiabatic taper devices appears in the publication, W. J. Stewart et al., "Design Limitation on Tapers and Couplers in Single-Mode Fibers", Proc. IOPOC, 1985, pages 559–562. In order to meet this requirement, it appears that $\Delta_{2-3}$ must be lower than 0.125% and preferably lower than about 0.02%. The value of $\Delta_{2-3}$ is obtained from the equation $\Delta_{2-3} = (n_2^2 - n_3^2)/n_2^2$. The term $\Delta$ is often expressed in percent, i.e. one hundred times $\Delta$. As $\Delta_{2-3}$ becomes smaller, less refractive index-decreasing dopant is present in the silica-based matrix glass tube. The relatively hard matrix glass tube that is required in the process of making this type of achromatic coupler deforms the fibers therein during the tube collapse step of the coupler forming process.

The cores become so small in the coupling region that their effect on propagation becomes very small. When the fiber cladding diameter becomes sufficiently small, the composite of the core and cladding functions as the light guiding portion of the waveguide in the coupling region, and the surrounding low index matrix material functions as the cladding. Power therefore transfers between the adjacent fiber claddings in the coupling region.

As the output fibers become distorted or flattened, the area of contact between adjacent fibers increases and the composite structure of all output fibers is able to support composite modes. In a $1 \times 8$ coupler, for example, eight output fibers are disposed around the input fiber. Computer modeling of the coupling in the $1 \times 8$ geometry shows that input light that is propagating in the central fiber will not completely transfer to the eight individual output fibers. Rather, a small portion will couple to modes of the composite structure of the eight output fibers; those modes do not couple completely to the fundamental modes of the output fibers (the lowest order such mode in a $1 \times 8$ coupler, for example, is a "ring" or "donut" mode which radially uniform about the propagation axis). Light in the ring modes does not completely transfer to each of the individual output fibers in the up-taper region, and excess loss increases.

Even in a fused biconically tapered coupler, in which no overclad tube is employed, surface tension causes the fibers to fuse together with large areas of contact between adjacent fibers. Therefore, this type of coupler is also subject to increased excess loss due to composite modes.

SUMMARY OF THE INVENTION

It is an object of the invention to provide a fiber optic coupler that is so constructed that the coupling of light from an input fiber to a "composite mode" is inhibited. Another object is to provide a fiber optic coupler that exhibits low excess loss.

Briefly, the fiber optic coupler of the present invention comprises at least two single-mode optical fibers, each having a core surrounded by a cladding. The lowest refractive index of any of the claddings is $n_2$. Portions of the fibers extend in side-by-side fashion and are tapered and fused together to form a coupling region having input and output ends. At least two of the fibers constitute output fibers that extend from the output end of said coupling region. The coupling region is surrounded by a medium such as glass, air or the like having a refractive index $n_3$ that is lower than $n_2$. The coupler includes composite mode inhibiting means comprising transparent material of refractive index $n_4$ that extends between the claddings of adjacent output fibers in the coupling region, wherein $n_4$ is less than $n_2$.

BRIEF DESCRIPTION OF THE DRAWINGS

FIG. 1 is a cross-sectional view of a coupler preform.

FIG. 2 is a cross-section taken along lines 2—2 of FIG. 1.

FIG. 3 is a cross-sectional view of an output optical fiber that is employed in the coupler preform of FIGS. 1 and 2.

DETAILED DESCRIPTION OF THE INVENTION

Figure 4:
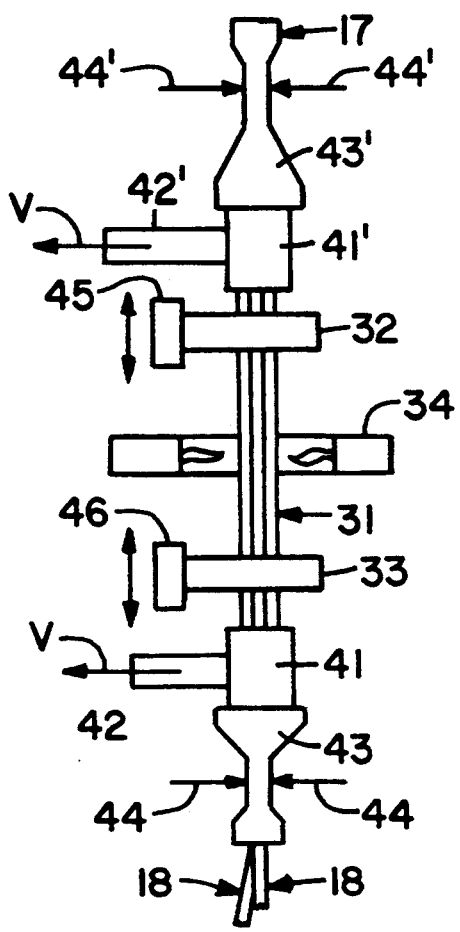
FIG. 4 is a schematic illustration of an apparatus for collapsing and stretching the preform of FIG. 1.

The drawings are not intended to indicate scale or relative proportions of the elements shown therein.

FIGS. 1, 2 and 3 illustrate a method of assembling a coupler preform 31 that can be formed into a 1×8 fiber optic coupler in which composite modes are inhibited. The protective coating is stripped from the ends of nine coated fibers and the endfaces are provided with antireflection terminations. Each fiber includes a core and cladding. The uncoated end portions of eight output optical fibers 18 are inserted into bore 14 of overclad tube 13 in the arrangement shown in FIG. 2, coatings 22 ending within funnel 15 as shown in FIG. 1.

The softening point temperature of overclad tube 13 should be lower than that of the fibers that are to be inserted therein, and the refractive index of the inner region of the tube must be lower than that of the fiber claddings. In some instances, the tube refractive index is dictated by the coupler function. In general, suitable tube compositions are $SiO_2$ doped with 0.15 to 25 wt. % $B_2O_3$ and $SiO_2$ doped with 0.1 to approximately 2.5 wt. % fluorine or combinations thereof up to the maximum levels indicated. In addition to lowering the softening point temperature of $SiO_2$, $B_2O_3$ and F also decrease its refractive index.

Output fiber distortion is exacerbated when a relatively high viscosity overclad tube is collapsed onto the output fibers. The tube can be made softer by forming it from a base glass doped with one or more refractive index-decreasing dopants such as $B_2O_3$ and fluorine and one or more refractive index-increasing dopants such as $GeO_2$ and $TiO_2$. The combination of the two types of dopants provides a refractive index $n_3$ that results in the desired value of $\Delta_{2-3}$. Employing tubes of relatively soft glass enhances to a certain extent the collapsing of the tube onto the fibers; the tube glass flows around the fibers without distorting their shape as much as a harder glass would. However, because of the intricate balancing of dopants that is required with this embodiment, it is difficult to implement.

Tubes having radial changes in composition have also been employed to make couplers. The inner region of the tube adjacent the tube bore is formed of a composition that provides the desired value of $\Delta_{2-3}$. The remainder of the tube can be formed of one or more regions having refractive indices that differ from the inner region. In such a gradient composition tube, the thickness of the inner region must be sufficiently large to have negligible impact on the expansion of the mode field and the fiber-to-fiber coupling in the tapered coupling regions.

In accordance with one embodiment of the invention, each of the output fibers 20 is formed as shown in FIG. 3. Fibers 20 have a core 20a, a cladding 20b and a surface region 20c having a refractive index $n_4$ lower than that of cladding 20b. The function of surface region 20c is described below. Surface region 20c is preferably formed of $SiO_2$ doped with fluorine. It is thought that $B_2O_3$ could be substituted for some or all of the fluorine, since $B_2O_3$ also lowers the refractive index. Although input fiber 19 need not have a low refractive index surface region for purposes of inhibiting composite modes, it is preferred that fiber 19 be identical to fibers 20 to ensure good coupling from fiber 19 to fibers 20.

A drop of glue is applied to a portion of the uncoated end of fiber 19 adjacent coating 21, and it is inserted into a short piece 10a of spacer tube. The glue occupies the space between the fiber and spacer tube as shown by the dark line between them. After the glue is cured, the remaining uncoated portion of fiber 19 is inserted into a piece 10b of spacer tube. Tube 10b is not glued to fiber 19. Tube 10b is sufficiently long that it extends entirely through midregion 27. The resultant combination of fiber 19 and tubes 10a and 10b is inserted through funnel 12 and into the cavity at the center of fibers 20 until coating 21 is within funnel 12.

A drop 36 of glue is applied to the outer circumference of coated fibers 18 to tack them to endface 24, the glue being applied in such a manner that access to bore 14 is not blocked. A drop 35 of glue similarly secures fiber 17 to endface 23.

Coupler preform 31 can be further processed in the draw apparatus of FIG. 4. Preform 31 is inserted through ring burner 34 and is clamped to draw chucks 32 and 33 which are mounted on motor controlled stages 45 and 46. The fibers are threaded through the vacuum attachments 41 and 41', which are then sealed to the ends of preform 31. Typical vacuum attachments are disclosed in U.S. Pat. No. 5,017,206 which is incorporated herein by reference. Vacuum is supplied to tube 41 through line 42. One end of a length of thin rubber tubing 43 is attached to that end of vacuum attachment 41 opposite preform 31; the remaining end of the tubing extending within tube clamping means (not shown). Upper vacuum attachment 41' is similarly associated with line 42', tubing 43' and tube clamping means. The coated portions of the fibers extend from tubing 43 and 43'. When air pressure is directed against tubing 43 and 43' as indicated by arrows 44, 44', to clamp the tubing against the fibers extending therethrough, bore 14, as well as the interstices between the fibers and spacer tubing therein, is evacuated through lines 42 and 42'.

Figure 5:
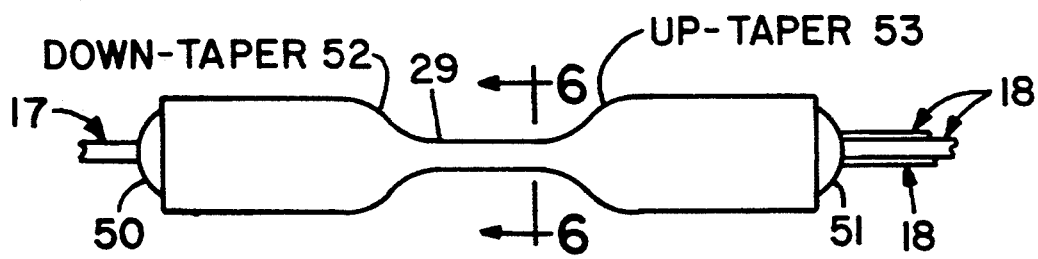
FIG. 5 shows a coupler preform after it has been stretched and sealed at its ends.
Figure 8:
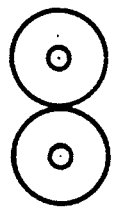
FIGS. 8–11 illustrate various fiber configurations that can be employed in the present invention.
Figure 9:
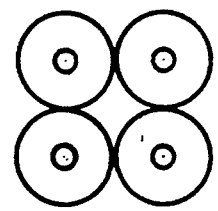
Figure 10:
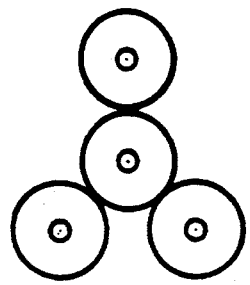
Figure 11:
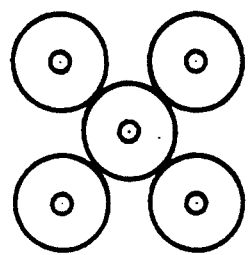

While preform 31 is evacuated, ring burner 34 heats tube 13, causing midregion 27 to collapse onto optical fibers 20. Thereafter, the center of the collapsed region is heated, and stages 45 and 46 pull in opposite directions to elongate preform 31 to form fiber optic coupler 28 having neckdown region 29 (FIG. 5). The open space in funnels 12 and 15 is then filled with glue 50 and 51, respectively, to increase the pull strength of the optical fiber pigtails extending from the ends of the coupler.

Figure 6:
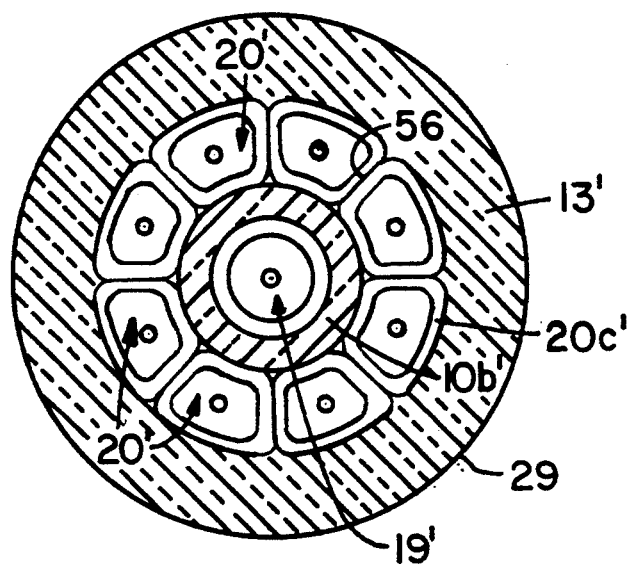
FIG. 6 is a cross-section taken along lines 6—6 of FIG. 5.

FIG. 6 illustrates the shape of the fibers in the coupling region. Elements of this figure that are similar to those of FIGS. 2 and 3 are represented by primed reference numerals. Note that there is a relatively large area of contact 56 between adjacent output fibers 20'. Output fibers 20' are sufficiently distorted that ring modes could propagate therein if means such as surface regions 20c' were not provided for inhibiting mode coupling to composite modes.

Assume that surface regions 20c' were not present in output fibers 20'. Since the combination of the core and cladding of the output fibers functions as the light propagating waveguide in the coupling region, and the matrix glass from tube 13' functions as the cladding, it can be seen that the combination of output fibers 20' constitutes a ring-shaped core into which composite modes can couple. In a 1×8 coupler in which the claddings of fibers 19' and 20' are formed of pure silica, and spacer tube 10b' and tube 13' are formed of silica doped with 0.5 weight % $B_2O_3$, coupler excess loss is approximately 1.0 dB. A portion of this loss is attributed to light from the input fiber which has coupled to modes which are bound by the composite structure of the eight outer fibers and which does not completely transfer back to each of the output fibers in the up-taper region 53.

Surface regions 20c' (FIG. 6) create a low index region between each pair of adjacent output fibers 20'. The low index regions function as means for inhibiting the coupling of light in down-taper region 52 to one or more composite modes that are common to all of the output fibers. The reduction of composite modes and thus the reduction of excess loss is dependent on the thickness and the refractive index of surface layers 20c'. A thicker surface region might break up the composite mode better, but it could also interfere with coupler function. For example, in an achromatic coupler having a low value of $\Delta_{2\text{-}3}$, a thick layer 20c' would interfere with achromaticity since it would appear to be part of the matrix glass.

The optical performance of an index layer in a waveguide is often characterized in terms of the V-number which is given by $$V_{RING} = \frac{2\pi}{\lambda} n_{RING} \sqrt{2\Delta_{2\text{-}4}(r_2^2 - r_1^2)} \quad (1)$$

for an index layer having inside and outside radii $r_1$, and $r_2$, respectively, and having an index difference $\Delta_{2\text{-}4}$ relative to that of the fiber cladding refractive index $n_2$, where $\Delta_{2\text{-}4} = (n_2^2 - n_4^2)/n_2^2$. The V-number can be rewritten in terms of the layer thickness t, which is equal to $(r_2 - r_1)$ and the average radius $r_{AVG}$, which is equal to $(r_1 + r_2)/2$:

$$V = \frac{2\pi}{\lambda} n_{RING} \sqrt{4\Delta_{2\text{-}4} t r_{AVG}} \quad (2)$$

Because in most practical cases for single-mode waveguides, $\Delta$ is very small (0.2 to 2.0%), and thus the variation in $n_{RING}$ is small, the variation of V with index difference $\Delta$, thickness t and average radius $r_{AVG}$ can be captured by the variation in the product $\Delta t r_{AVG}$. In both the 1×8 coupler of Example 1 and the 1×2 coupler of Examples 2, this product was approximately 0.65 $\mu m^2$.

This implies that a large range of $\Delta$ and t values can be used to achieve this effect, and that small $\Delta$ values combined with large thickness t can be as effective as large $\Delta$ values and small thicknesses. Practical limitations will limit the range over which this is true. For instance, the value $r_1$ must be kept large enough so that it does not impact the mode field of the fiber core and result in increased splice loss with external fibers. Even if the product $\Delta t r_{AVG}$ is varied somewhat, the low index ring will still be effective in inhibiting mode coupling to composite modes. Increased values of $\Delta t r_{AVG}$ will, in general, lead to more effective elimination of composite mode effects. However, varying $\Delta t r_{AVG}$ will also impact the coupling. The amount of impact on coupling which can be tolerated will depend on the limitations of the coupler fabrication apparatus. Also, increased values of $t r_{AVG}$ may force steeper tapers, and this could lead to nonadiabatic mode coupling losses.

Couplers have been made in which the input fiber and each of the eight output fibers have a surface region 20c, the thicknesses of which is approximately 3 $\mu m$ and the composition of which is $SiO_2$ doped with 1 wt. % fluorine, and the overclad tube comprises silica doped with 0.5 wt % $B_2O_3$. After the stretch step, the thickness of the fluorine doped layer in the coupling region is about 0.6 $\mu m$. Such couplers exhibit an excess loss that is typically about 0.3 dB lower than that in couplers having output fibers made without the surface regions.

Figure 7:
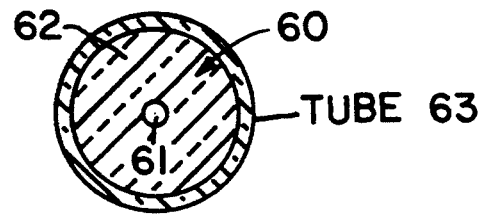
FIG. 7 is a cross-section of a fiber and tube that is used in another embodiment.

In a further embodiment, a preform is formed in a manner similar to that described in conjunction with FIGS. 1 and 2 except for the following differences. Rather than employing output optical fibers having a low index surface region, the method employs conventional fibers 60 (FIG. 7), each having a core 61 and cladding 62. Before it is inserted into overclad tube 13, each fiber is inserted into a thin tube means 63, the composition of which can be the same as surface region 20c. Alternatively, the tube could have a radially nonuniform refractive index, the inner region being formed of a glass such as $SiO_2$ to match the fiber cladding and the outer region being formed of $SiO_2$ doped with F and/or $B_2O_3$. Tube means 63 is preferably formed of two tubes that are similar in length to tubes 10a and 10b. A short length of tube is initially glued onto each fiber, and the fiber is then inserted into the longer tube. After this has been done to all of the output fibers, they are inserted into the overclad tube as shown in FIG. 2. The remainder of the process is the same as that described above.

Whereas the invention has been specifically described in conjunction with 1×8 couplers or splitters, it is applicable to other types of 1×N couplers, wherein N is equal to 2, 3, 4, 6, etc. A 1×6 coupler made from output fibers having a low index surface region would need no spacer tube 10b, since the six output fibers would fit around the central fiber. FIGS. 8 through 12 show some of the many fiber arrangements that could be employed. The arrangement of FIG. 8 could be used to make a 1×2 or a 2×2. The arrangement of FIG. 9 could be used to make a 1×4, 2×4, 2×2 or 4×4. The arrangements of FIGS. 10 and 11 could be used to make 1×4's. The arrangement of FIG. 12, which also shows the overclad tube, could be used to make a 1×2, a 1×3, a 2×3 or a 3×3.

Whereas the preferred manufacturing technique results in a coupler having optical fiber pigtails extending therefrom, the invention also applies to overclad couplers of the type wherein the fibers extend through the elongated matrix glass body but end flush with the body endface. Methods of making such a coupler are disclosed in U.S. Pat. Nos. 4,773,924 and 4,799,949. Briefly, the method comprises inserting a plurality of optical fiber preform rods into a glass tube, heating and stretching the resultant preform to form a glass rod which is then severed into a plurality of units. Heat is applied to the central region of each unit, and the central region is stretched to form a tapered region as described herein.

Figure 13:
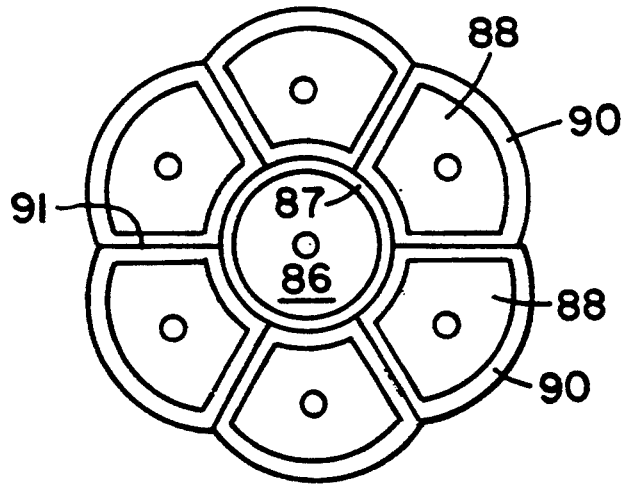
FIG. 13 is a cross-section of a fused biconically tapered coupler embodying the principles of this invention.

FIG. 13 illustrates the manner in which the present invention is applied to fused biconical couplers. The coupling region of the illustrated 1×6 coupler includes input fiber 86 surrounded by six output fibers 88. Each of the fibers includes a core and a cladding. In addition, input fiber 86 may have a low index surface region 87, and output fibers 88 have low index surface regions 90. Since a region of contact 91 exists between each pair of adjacent fibers 88, modes could couple to the composite waveguide formed of output fibers 88 in the absence of surface layers 90. However, layers 90 function to inhibit such mode conversion as described above in conjunction with overclad couplers.

The present invention provides major improvement when it is applied to overclad couplers that employ an overclad tube the composition of which is such that the value of $\Delta_{2-3}$ is sufficiently low that the coupler exhibits improved achromaticity. The fibers of such couplers, when conventionally formed, tend to be excessively distorted because of the high viscosity of the overclad tube at coupler forming temperatures. Such couplers therefore exhibit higher excess loss when the technique of this invention is not employed.

EXAMPLE 1

The following specific example is directed to a method of making a 1×8 splitter. A glass tube 13 having a 3.8 cm length, 2.8 mm outside diameter, and 465 $\mu$m longitudinal bore diameter was employed; it was formed of silica doped with about 0.5 wt. % $B_2O_3$, the composition being relatively uniform throughout its radius. Each of the funnels 12 and 15 was formed by flowing the gas phase etchant $NF_3$ through the tube while uniformly heating the end of the tube. The depths of funnels 12 and 15 were about 2 mm and 3 mm, respectively, and the maximum diameter of both funnels was about 1.8 mm.

Nine 1.5 m long optical fibers were cut from a reel of fiber. The fibers were formed by starting with standard consolidated optical fiber preforms of the type used to make single-mode telecommunication fibers. The core composition was $SiO_2$ doped with 8.5 wt. % $GeO_2$. A thin layer of $SiO_2$ particles was deposited on the outer surface of the preform, and it was consolidated in a furnace through which 40 lpm (liters per minute) helium, 1 lpm chlorine and 2 lpm $SiF_4$ flowed. The resultant preform was drawn into a fiber having an outside diameter of 125 $\mu$m and a core diameter of about 7.7 $\mu$m. The thickness of the surface region was about 3 $\mu$m, and its composition was $SiO_2$ having a fluorine concentration such that the $\Delta_{2-4}$ of the fluorine doped layer was about 0.35% below silica.

The fibers were provided with stripped ends having antireflection terminations by the following technique. A 6 cm long section of coating was removed from the end of each fiber. A flame was directed at the center of the stripped region of fiber, while the end of the fiber was pulled and severed to form a tapered end. The tip of the fiber was heated by a burner flame to cause the glass to recede and form a rounded endface, the diameter of which was equal to or slightly smaller than the original uncoated fiber diameter. The resultant stripped end region was about 3.2 cm long.

The microtubing from which spacer tubes 10a and 10b were severed had an outside diameter of 205 $\mu$m and an inside diameter of 130 $\mu$m. A length of coated spacer tube was used as a tool for initially inserting the eight output fibers around the surface of the tube bore. A length of spacer tube was provided with a urethane acrylate coating having an outside diameter of 450 $\mu$m. About 2.5 cm of coating was stripped from the end of the spacer tube. The uncoated end of the spacer tube was inserted a sufficient distance into end 23 of tube 13 to ensure that the end of the spacer tube coating was located in bore 14 a short distance beyond the narrow end of funnel 15. Eight fibers 20 were inserted into bore 14 and positioned around the spacer tube tool, which was then removed.

Spacer tubes 10a and 10b were cut to lengths of approximately 6 mm and 28 mm, respectively. The tubes were composed of $SiO_2$ doped with 0.4 wt.% $B_2O_3$. A small amount of UV curable epoxy was applied to the stripped region of fiber 19 near coating 21. Spacer tube 10a was slid onto the fiber until it was positioned adjacent the end of coating 21, and the epoxy was cured with UV light. Spacer tube 10b was then threaded onto fiber 19. The resultant combination was inserted through funnel 12 and into the cavity at the center of the eight fibers 20. The insertion step was continued until the end of coating 21 was within funnel 12. A small amount of UV-curable epoxy was applied as described above to hold the fibers in place.

Vacuum was applied to one end of the tube bore and several drops of ethyl alcohol were applied to the other end to wash out debris. The preform was then put into the apparatus of FIG. 4 as described above, and a vacuum of 18 cm of mercury was connected to both ends of the tube bore.

With gas and oxygen flowing to the burner at rates of 0.55 slpm and 1.10 slpm, respectively, the flame heated the tube for about 18 seconds to collapse the matrix glass onto the fibers. After the tube cooled, with flow rates of gas and oxygen remaining the same; the burner was reignited. The flame heated the central portion of the collapsed and after 10 seconds, the supply of oxygen to burner 34 was turned off. Stages 45 and 46 were pulled in opposite directions at a combined rate of 1.0 cm/sec until the central portion of midregion 27 was stretched 0.8 cm.

The stretching distance was determined as follows. A coupler was initially elongated by some distance determined by previous experience. The optical characteristics of the resultant device were measured, and the stretching or elongation distance of the subsequently made coupler was adjusted in such a manner as to more nearly achieve the desired characteristics. By this process, the optimal stretching distance was achieved. Thereafter, all couplers of that type were stretched the optimal distance in order to achieve the desired optical characteristics. However, process parameters such as the elongation distance can be fine tuned as a result of optical characterization of the produced couplers.

After the coupler cooled, the vacuum lines were removed. Clamps 44 and 44' were released from the flexible vacuum hoses 43 and 43', and nitrogen was supplied to tubes 42 and 42'. The turbulence created by the nitrogen flowing through tubes 43 and 43' enhanced the release of the fiber from those tubes. Upon completion of the nitrogen purge, vacuum attachments 41 and 41' were removed. The coupler remained in the chucks during the application of glue to funnels 12 and 15.

A heat gun was aimed at upper region of the coupler between burner 34 and chuck 32 for about 15 seconds. A syringe was filled with UV-curable epoxy, and its applicator needle was manipulated to the bottom region of funnel 12. A sufficient amount of epoxy 51 was injected into the funnel to fill it and cover the bare fiber. After 2 minutes had passed, the epoxy in lower funnel 15 was subjected to a UV light source.

The heating, epoxy application and curing process was then repeated at the lower funnel 15. The coupler body was then released from chucks 32 and 33. To ensure full initiation of the epoxy, the coupler was exposed to additional UV light.

Couplers made in accordance with this example generally exhibited a minimum excess device loss of about 0.7 dB at 1430 nm. The lowest measured excess loss was 0.57 dB.

EXAMPLE 2

Figure 12:
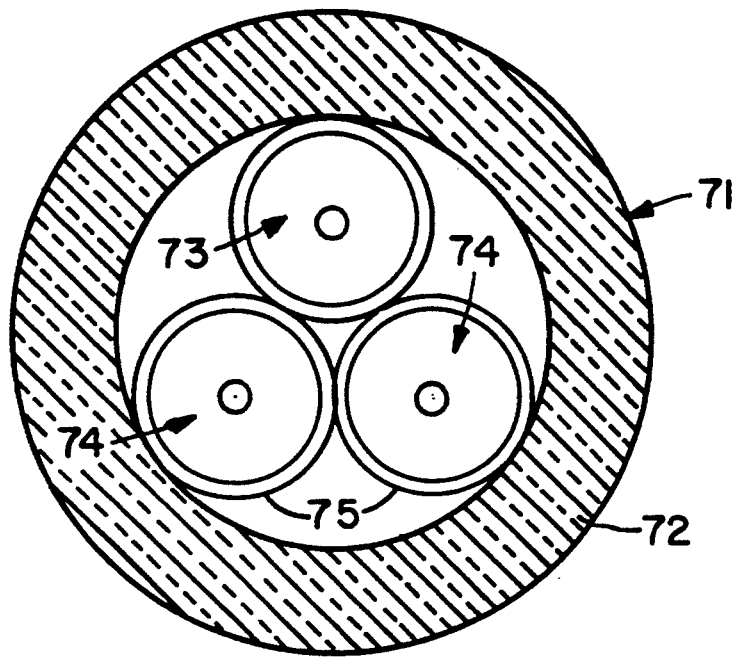
FIGS. 12 is a cross-section of a preform for making a 1×2 3-fiber coupler.

FIG. 12 shows a coupler preform 71 for forming a 1×2, 3-fiber coupler. The fibers consisted of standard 125 μm outside diameter telecommunication fibers having a 8.0 μm diameter core formed of $SiO_2$ doped with 8.5 wt. % $GeO_2$ and a $SiO_2$ cladding. The coating was stripped from the ends of fibers 73 and 74 as described above, and each of the exposed fibers was inserted into a 205 μm outside diameter, 130 μm inside diameter microtube 75 formed of $SiO_2$ doped with 0.3 wt. % $B_2O_3$. The Δ of the microtube was about 0.015% below silica. Input fiber 73 (with microtube) was inserted into one end of overclad tube 72, and output fibers 74 (with microtubes) were inserted into the other end to form preform 71. The excess loss of the resultant coupler was approximately 0.7 dB.

Similar 1×2 3-fiber couplers were formed from preforms that did not include microtubes 75. After the coupler was drawn, those portions of the fibers that were in the taper and coupling regions became flattened to such an extent that the coupler exhibited excess loss of about 1.1 dB. The 0.4 dB additional excess loss was due to composite modes which appear to have been bound by the two output fibers and possibly by the input fiber.

We claim:

1. A fiber optic coupler comprising
at lest two single-mode optical fibers, each having a core surrounded by a cladding, the lowest refractive index of any of said claddings being $n_2$, portions of said fibers extending side-by-side and being tapered and fused together to form a coupling region having input and output ends, at least two of said fibers constituting output fibers that extend from the output end of said coupling region,
said coupling region being surrounded by a medium having a refractive index $n_3$ that is lower than $n_2$, said medium comprising an elongated body of matrix glass having two end regions and a midregion, said optical fibers extending longitudinally within said body and being fused together along with a midregion of said body, the diameter of the central portion of said midregion being smaller than the diameters of said end regions, said central portion of said body midregion constituting said coupling region, and
composite mode inhibiting means comprising transparent material of refractive index $n_4$ extending between the claddings of adjacent output fibers in the coupling region, wherein $n_4$ is less than $n_2$.

2. A coupler in accordance with claim 1 wherein said composite mode inhibiting means comprises a surface region completely surrounding each of the output optical fibers.

3. A coupler in accordance with claim 2 wherein said coupler comprises three optical fibers disposed in a triangular array in said coupling region when viewed in a plane perpendicular to the longitudinal axis of said body.

4. A coupler in accordance with claim 2 wherein said coupler comprises a central optical fiber and at least six optical fibers disposed in a circular array about said central fiber in said coupling region when viewed in a plane perpendicular to the longitudinal axis of said body.

5. A coupler in accordance with claim 2 wherein said matrix glass is a cylindrically-shaped body through which said fibers longitudinally extend, the diameter of a portion of said body remote from the ends thereof being smaller than the diameters of the ends of said body.

6. A coupler in accordance with claim 2 wherein $n_3$ is lower than $n_2$ by such an amount that the value of $\Delta_{2\text{-}3}$ is less than 0.125%, wherein $\Delta_{2\text{-}3}$ equals $(n_2^2-n_3^2)/2n_2^2$.

7. A method of making a 1×N fiber optic coupler, wherein N equals 2 or more, said method comprising
forming a coupler perform by performing the steps of
providing a glass tube having first and second opposite ends and a midregion, a longitudinal bore extending from a first end of said tube to a second end thereof, at least the inner portion of said tube adjacent said bore having a refractive index $n_3$,
disposing within said bore a portion of an input glass optical fiber and the end portions of a plurality of output glass optical fibers, each of said fibers having a core surrounded by a cladding of refractive index less than that of said core, the lowest refractive index of the claddings of said optical fibers being $n_2$, a portion of said first fiber extending beyond the first end of said tube, a portion of said output fibers extending beyond the second end of said tube,
providing said preform with means for inhibiting the coupling of light to composite modes that propagate in the composite of said output paths, said inhibiting means comprising a layer of glass of refractive index $n_4$ that extends between the cladding regions of adjacent output fibers in said midregion, wherein $n_4$ is less than $n_2$, said layer of glass being different from said matrix glass,
collapsing said tube midregion onto said fibers, and
drawing the central portion of said midregion to reduce the diameter thereof.

8. A method in accordance with claim 7 wherein said input optical fiber extends only from said first end of said tube and said two output optical fibers extend from said second end of said tube.

9. A method in accordance with claim 7 wherein the step of providing said preform with means for inhibiting comprises inserting each of said output fibers into a respective glass tube of refractive index $n_4$.

10. A method in accordance with claim 8 wherein the step of providing said preform with means for inhibiting comprises forming on the outer surface of at least said output fibers a glass surface region of refractive index $n_4$.

11. A fiber optic coupler comprising
at least three optical fibers fused together along a coupling region, the diameters of said fibers in said coupling region being smaller than the diameters of the remainders of said fibers outside said coupling region, each of said fibers comprising a core surrounded by a cladding, the refractive index of said fiber claddings being less than that of said fiber cores, said coupling region being disposed in a medium having a refractive index $n_3$, the lowest refractive index of said fiber claddings being $n_2$, $n_2$ being greater than $n_3$, one of said fibers functioning as an input fiber and at least two of said fibers functioning as output fibers, and means for inhibiting the coupling of light to composite modes that propagate in the composite of said output fibers, said inhibiting means comprising a glass surface region surrounding each of said output fibers, the refractive index $n_4$ of said surface regions being less than $n_2$, the material of which said glass surface regions are comprised being different from the material of which said medium is comprised.

12. A fiber optic coupler comprising at least three optical fibers fused together along a coupling region, the diameters of said fibers in said coupling region being smaller than the diameters of the remainders of said fibers outside said coupling region, one of said fibers functioning as an input fiber and at least two of said fibers functioning as output fibers, each of said fibers comprising a glass core, a glass cladding disposed on said core, a glass surface region disposed on the cladding of at least said output fibers, the refractive index of said fiber claddings being less than that of said fiber cores, said coupling region being disposed in a medium having a refractive index $n_3$, the lowest refractive index of said fiber claddings being $n_2$, $n_2$ being greater than $n_3$, the refractive index $n_4$ of said surface regions being less than $n_2$ and being such that said surface regions function as means for inhibiting the coupling of light to composite modes that propagate in the composite of said output fibers, the material of which said glass surface regions are comprised being different from the material of which said medium is comprised.

* * * * *